H. SCHNACKENBERG.
OUTFIT FOR PRODUCING BEVERAGES.
APPLICATION FILED JAN. 21, 1920.
1,366,839.
Patented Jan. 25, 1921.
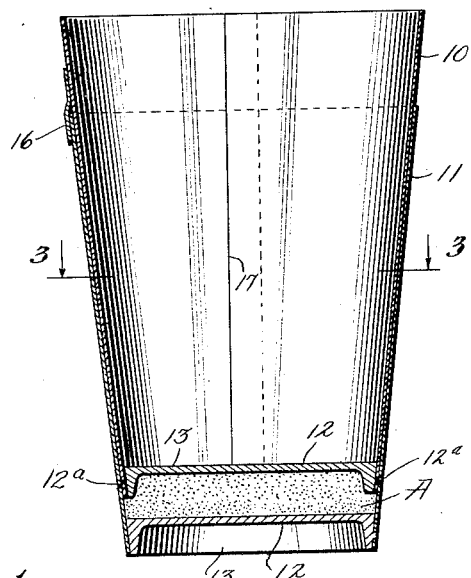
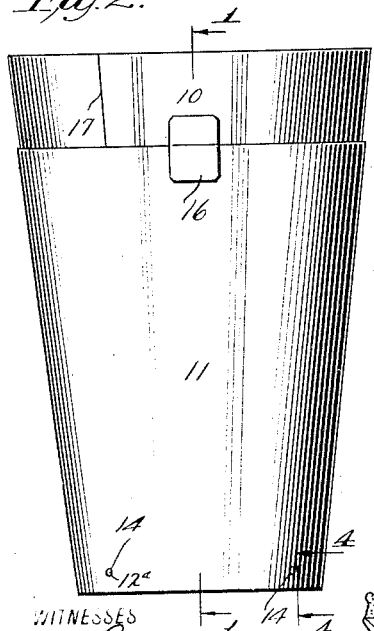
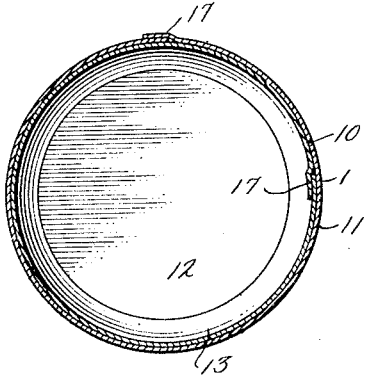
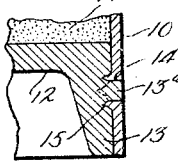
INVENTOR
HENRY SCHNACKENBERG.
BY
ATTORNEYS

UNITED STATES PATENT OFFICE.

HENRY SCHNACKENBERG, OF BROOKLYN, NEW YORK.

OUTFIT FOR PRODUCING BEVERAGES.

1,366,839.  Specification of Letters Patent.  Patented Jan. 25, 1921.

Application filed January 21, 1920. Serial No. 353,124.

*To all whom it may concern:*

Be it known that I, HENRY SCHNACKENBERG, a citizen of the United States, and a resident of the city of New York, borough of Brooklyn, in the county of Kings and State of New York, have invented new and Improved Outfits for Producing Beverages, of which the following is a description.

My invention relates to an outfit adapted to be vended as a unit and comprising individual drinking cups as well as ingredients for the production of an aerated or other soft drink, or the like.

The invention has for an object to provide a unit of the indicated character in which the nested cups form a chamber containing the ingredients for the beverage, the cups being of a form and character that the chamber for the ingredients will be air-tight and moisture-proof, insuring the preservation of the ingredients against contamination or deterioration.

A further object of the invention is to provide stability in the cups so that they will be maintained intact, both when in assembled relation and in separated form for use as containers for the produced beverage.

Reference is to be had to the accompanying drawings forming a part of this specification, it being understood that the drawings are merely illustrative of one example of the invention.

Figure 1 is a vertical section of a unit embodying my invention, the section being taken on the line 1—1, Fig. 2;

Fig. 2 is a side elevation;

Fig. 3 is a horizontal section on the line 3—3, Fig. 1;

Fig. 4 is a detail in vertical section as indicated by the line 4—4, Fig. 2.

In carrying out my invention a pair of drinking cups 10, 11 is provided, flaring upwardly that the one may be nested within the other in a manner that the bottom 12 of the inner cup will lie above and spaced from the bottom 12 of the outer cup so that the assembled cups will present a chamber between the bottoms 12 thereof for holding a quantity of ingredients indicated at A for the production of a beverage, it being understood that the ingredients may be of any known composition and will vary according to the particular beverage to be produced, the arrangement being such that the ingredients will be supported above the bottom of the outer cup beneath the bottom of the inner cup.

The bodies of the cups are formed in practice of waxed paper such as commonly employed for the making of individual drinking cups. The bottoms 12, however, instead of being produced from waxed paper are formed from solid wax cast in position in the waxed paper bodies, the purpose being to provide a stable bottom construction and what is important, to insure a moisture-proof and air-tight chamber for the ingredients A. The solid wax bottoms are interlocked with the paper bodies, and for the purpose the bodies are produced with lateral punctures 14 near the lower edges. The bottoms 12 are molded with annular flanges 13 and in forming the same from molten wax the latter will flow into the openings 14 as indicated at 13$^a$, Fig. 4. Moreover, the puncturing of the paper bodies produces at each puncture 14, a bur 15 at the inner end of the puncture, thereby increasing the interlocked engagement between the molded wax and the cup body.

To preserve the assembled form of the cups so that accidental separation may not expose the ingredients in the chamber formed thereby for the ingredients, I apply to the exterior of the assembled cups a destructible connection 16 which may consist of a small strip of paper applied to the cups at the upper edge of the outer cup, the paper having suitable adhesive material that it will adhere to both cups and prevent their relative movement. In the form shown the paper bodies are made from sheet paper bent laterally into round form, the edges 17 of the sheet being overlapped and caused to adhere to each other in the usual manner of forming analogous articles.

In the use of the described unit the connecting device 16 is broken and the inner cup withdrawn. A proper quantity of water is placed in the inner cup and then poured into the outer cup to mix with the ingredients therein. Mixing may be produced by alternately pouring the preparation from one cup to the other repeatedly until a thorough mixture results. The cups are so proportioned that they will jointly hold an aerated beverage resulting from the adding of water to the ingredients.

It is to be noted that the unit is vendable as such with its chamber and the sealed beverage ingredients, as distinguished from a vendable cup with merchandise therein. By forming the bottoms of the cups of solid molded wax, the bottom of a cup may be molded therein at a greater or less distance from the bottom edge of the tubular body and in that way a chamber may be produced in a unit formed by two cups with a space larger or smaller according to the quantity of the substance to be sealed therebetween. Also, the flange 13 strengthens the bottom edge of the cup in addition to the utilization of the flange for interlocking of the wax form with the cup body.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim:

1. As a new article of manufacture, a device of the class described including inner and outer cups, the bodies of the cups being formed of water-proof paper and held together to constitute a vendable unit; the bottoms of said cups being composed of wax and spaced from each other at the bottom to form a moisture-proof chamber therebetween; together with a commodity in said chamber.

2. A device of the class described including inner and outer cups, the bodies of the cups being formed of water-proof paper and the bottoms of said cups being composed of wax, said bodies adjacent to said bottoms presenting a lateral opening and the wax of said bottom filling said opening effecting an interlocked engagement with the body.

3. A device of the class described including inner and outer cups, the bodies of the cups being formed of water-proof paper and the bottoms of said cups being composed of wax, said bodies adjacent to said wax bottoms having transverse punctures and presenting burs at the inner ends of the punctures, and the material of the wax bottoms being interlocked with the bodies at said openings with said burs.

4. A device of the class described including an outer cup, an inner cup fitting the outer cup, the bottoms of the cups being spaced so that a chamber is formed therebetween, said chamber being air-tight and moisture-proof, and a commodity contained in said chamber, the inner cup extending above the outer cup; together with a destructible connection between said cups at the exteriors.

5. As a new article of manufacture, a vendable unit comprising two cups in nested relation and in moisture-proof and air-tight frictional contact; forming a water-tight and air-tight chamber between the bottoms thereof; together with a commodity in said chamber, said cups with said chamber and said commodity constituting a unit vendable as such.

6. As a new article of manufacture, a vendable unit comprising two cups, and external means uniting the pair of cups into a unit, said cups being in water and air-tight frictional contact, forming a moisture and air-proof chamber between the bottoms thereof; together with a commodity in said chamber, said cups with said chamber and said commodity constituting a unit vendable as such.

HENRY SCHNACKENBERG.